Sept. 19, 1967

J. J. SHAPIRO 3,343,078

SELF-CONTAINED CONDUCTIVITY METER HAVING
A TUBULAR GLASS ELECTRODE ASSEMBLY

Filed Feb. 7, 1964

INVENTOR
JUSTIN J. SHAPIRO

BY Herman L. Gordon

ATTORNEY

United States Patent Office 3,343,078
Patented Sept. 19, 1967

3,343,078
SELF-CONTAINED CONDUCTIVITY METER HAVING A TUBULAR GLASS ELECTRODE ASSEMBLY
Justin J. Shapiro, c/o Labindustries, 1740 University Ave., Berkeley, Calif. 94703
Filed Feb. 7, 1964, Ser. No. 343,375
1 Claim. (Cl. 324—30)

ABSTRACT OF THE DISCLOSURE

A self-contained conductivity meter for determining water in liquid materials by the Karl Fischer method, the meter consisting of a housing adapted to be manually held and containing a meter, with a scale and movable pointer exposed at an outer wall of the housing. Opposite this wall a hollow tubular glass electrode assembly is secured to the housing. The electrode assembly has a sealed uranium glass tip with a pair of spaced exposed platinum contact balls. Platinum wires embedded in the tip are mechanically connected to the balls. Tungsten wires are mechanically connected to the platinum wires and extend into the hollow glass electrode tube, being welded in respective nickel sleeves. Respective copper lead wires are welded in the nickel sleeves. A battery and adjusting rheostat are provided in the housing and are connected in a series circuit. The copper lead wires are connected to this series circuit. The scale of the meter has a colored intermediate zone to correspond with the water end point in a Karl Fischer titration and a differently colored terminating zone to correspond with the Karl Fischer end point color.

---

This invention relates to conductivity measuring devices, and more particularly to a self-contained conductivity meter especially suitable to provide an end point indication in the determination of water in various liquid materials by titration methods.

A main object of the invention is to provide a novel and improved conductivity meter especially useful in the determination of water in glycols, alkanolamines, and in other liquid materials by the so-called "Karl Fischer Method," the meter being simple in construction, being compact in size, and being provided with highly visible means for providing an end point indication in a titration by said method, allowing the user to titrate to a numerical value on a scale instead of merely to a color change in the liquid being titrated.

A further object of the invention is to provide an improved conductivity meter using a direct current source but nevertheless providing reliable indications, the meter being usable in the manner of a stirring rod so that the stirring action removes polarization products from its electrodes.

A still further object of the invention is to provide an improved compact, self-contained conductivity meter having a glass rod-like portion carrying its electrodes, the electrodes being mounted and sealed in said rod-like portion in a manner providing rigidity and strength, and in a manner allowing it to be immersed continually in corrosive Karl Fischer reagent without leaking.

A still further object of the invention is to provide an improved self-contained conductivity meter so arranged that the entire apparatus may be handled like a stirring rod, the electrode end thereof being immersed in the liquid being titrated or otherwise treated, and the meter end thereof facing the operator so that it can be easily observed, the meter portion thereof being provided with both a numerical conductivity scale and with a colored conductivity zone marker arrangement having respective colors corresponding to the colors of the solution at the corresponding points of the titration of the solution under test, the meter having a range of deflection through the end point indicating zone thereof sufficiently large to permit great accuracy in end point indication.

Further objects and advantages of the invention will become apparent from the following description and claims, and from the accompanying drawings, wherein:

Figure 1:
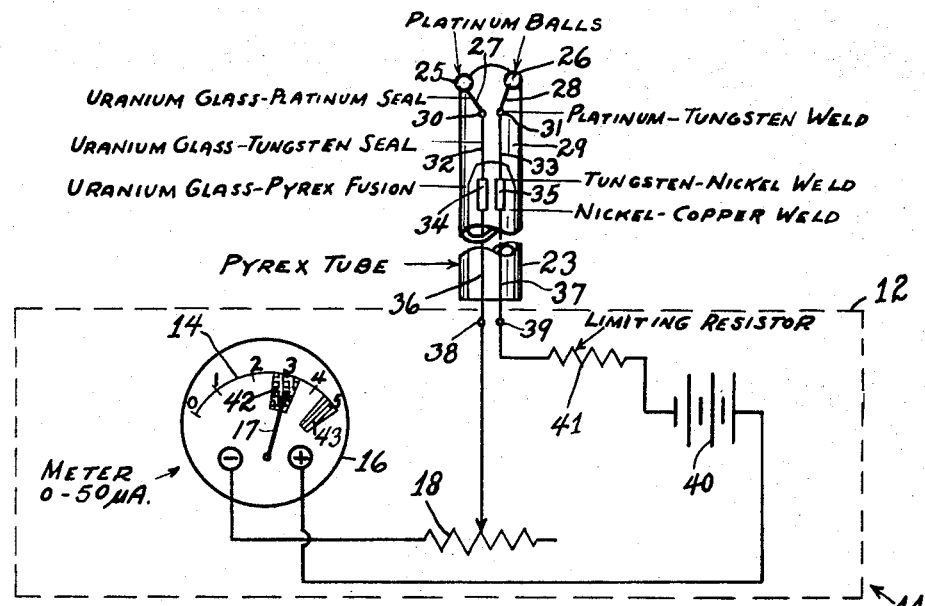
FIGURE 1 is a partly schematic diagram showing the electrical circuit and some important structural details of an improved conductivity meter constructed in accordance with the present invention.
Figure 3:
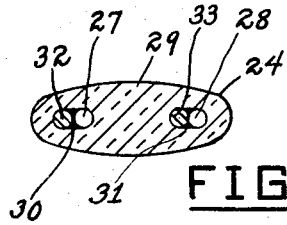
FIGURE 3 is an enlarged cross-sectional view taken substantially on line 3—3 of FIGURE 2.
Figure 4:
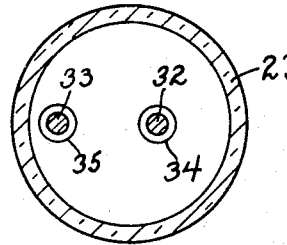
FIGURE 4 is an enlarged cross-sectional view taken substantially on line 4—4 of FIGURE 2.
Figure 2:
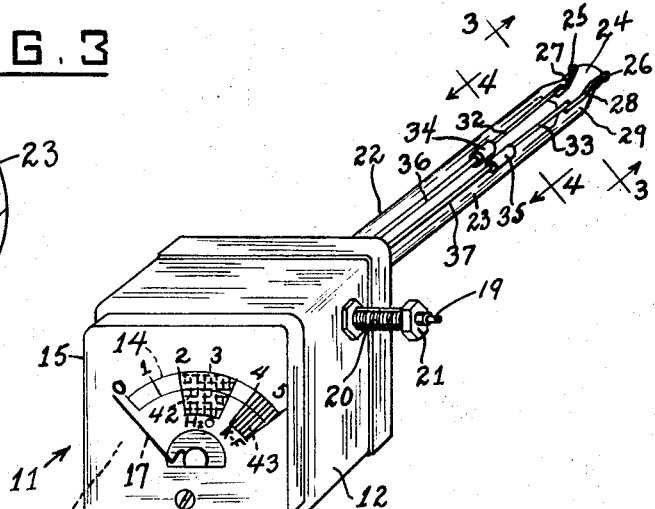
FIGURE 2 is a perspective view of a conductivity meter employing the structure shown in FIGURE 1.

Referring to the drawings, 11 generally designates a conductivity measuring device constructed in accordance with the present invention. The device 11 comprises a generally rectangular main housing 12 of approximately cubical shape and of sufficiently small size so that it may be easily held in the user's hand. The device has an indicating face 13 provided with an arcuate conductivity scale 14 and protectively enclosed in a transparent cover 15. The device is provided with a conventional meter movement 16 including an indicating pointer 17. Mounted in the housing 12 on a side wall thereof is a range-adjusting rheostat 18 having an adjusting shaft 19 which extends through an externally threaded split locking sleeve 20 provided with a locknut 21 for locking the shaft 19 in an adjusted position.

Rigidly secured to the back wall of housing 12 in any suitable manner is an electrode assembly generally designated at 22. Said assembly 22 comprises an elongated tubular Pyrex main body 23 to the end of which is fused a solid mass 29 of uranium glass having a flattened tip 24. Located at the opposite corner portions of tip 24 are respective exposed platinum electrode spheres 25, 26 having platinum lead wires 27, 28. Welded to the ends of the lead wires 27, 28 at 30, 31 are tungsten connecting wires 32, 33. The platinum wires 27, 28, the welds 30, 31, and the major portions of the tungsten terminal wires 32, 33 are sealingly embedded in the mass of uranium glass 29, the ends of the tungsten wires 32, 33 extending into the tubular Pyrex main body 23. Said ends are welded in the ends of respective short nickel connecting sleeves 34, 35. Welded in the opposite ends of the nickel sleeves 34, 35 are the ends of respective copper terminal wires 36 and 37, leading to terminals 38 and 39.

"Pyrex" and "uranium glass" are materials well known to those skilled in the art. The "Pyrex" glass may be similar to Pyrex No. 7740 borosilicate glass with a mean linear coefficient of expansion of $32 \times 10^{-7}$ in the 0° C. to 300° C. temperature range. The "uranium glass" may be similar to Corning No. 3321, with an expansion coefficient of $40 \times 10^{-7}$ for this temperature range. These glass materials are manufactured by Corning Glass Works, Corning, New York.

Housing 12 contains a conventional small mercury cell battery 40 and a limiting resistor 41 of approximately 4700 ohms. The rheostat 18 has a resistance winding of approximately 25,000 ohms. The terminals 38 and 39 are connected in a series circuit with resistor 41, battery 40, meter movement 16 and rheostat 18, as shown in FIGURE 1, the connecting wiring being contained inside the housing 12.

The indicating face 13 has a yellow area 42 on scale 14 to indicate the water end point and a brown area 43 to indicate the Karl Fisher end point.

The platinum-to-glass seal in tip 24 is followed by a tungsten-to-glass seal, the platinum being welded to the tungsten. As above mentioned, the tungsten is then welded to nickel, and the nickel is then welded to copper wires. It has been found that this arrangement allows the electrode assembly 22 to be immersed continually in Karl Fischer reagent without leaking. The welding sequence makes it possible to terminate in copper wires 36, 37 for soldering to conventional terminals posts 38, 39.

The entire apparatus 11 may be handled like a stirring rod with the electrode end in the solution and the meter end facing the operator. This stirring rod arrangement makes it possible to use direct current (of a small magnitude, such as approximately 50 microamperes) to measure the conductance, since the slightest stirring motion removes polarization products from the electrodes. The ball-shaped platinum electrodes are preferably recessed a substantial amount into the electrode tip 24 for rigidity and strength under these relatively rugged conditions.

The color coding at 42 and 43 lends considerable additional utility to the device. In a Karl Fischer titration, two color changes occur. First the solution becomes light yellow, then a brighter yellow, and then, suddenly, brown. Beginners often confuse the brighter yellow with the end point, not knowing that a further change will occur. With the instrument 11, the needle 17 cannot indicate the brown area 43 unless the end point has been reached, because the resistance change at the end point is so great, namely, from approximately 50,000 ohms to approximately 3,000 ohms or less. The large scale deflection through the end point permits great accuracy in the end point indication.

To use the instrument for general conductivity measurements the calibration control rheostat 18 is ordinarily adjusted so that the meter reads the significant figures of a known standard solution when the electrode portion 22 of the instrument is immersed in said standard solution.

In using the instrument for a Karl Fischer end point determination, the meter is adjusted (by means of rheostat 18) to provide a full scale indication with the electrode balls 25, 26 shorted. This will give proper readings for the water (yellow area 42) end point and for the Karl Fischer end point (brown area 43).

A description of the Karl Fischer method of titration is given in "Angewandte Chemie," 48, 394–6 (1935), and said method is also described in the paper of Richard Kieselbach, entitled "Stabilized Magic Eye indicator for Karl Fischer Titrations," Anal. Chem. 21, 1578 (1949). A further reference in which this method is discussed is "Aquametry" by J. Mitchell, Jr., and D.M. Smith, Interscience Publishers, New York, 1948, pp. 126–131.

The Karl Fischer reagent is commercially available, and is prepared by dissolving iodine in anhydrous methanol and first adding anhydrous pyridine, and subsequently adding sulfur dioxide.

The principle of the titration is that in a methanol-pyridine solution, iodine is not reduced by sulfur dioxide unless water is present. Karl Fischer reagent, which contains all of these components except water, can be used for determining water in glycols, alkanolamines, etc., by titration of the latter with this reagent. The brown iodine color of the reagent changes to yellow as long as water is available to permit the reaction to proceed.

The reagent used in the Karl Fischer method of titration described above is particularly corrosive, and great difficulty has been found in developing an effective seal which will resist leakage along the conductors leading from the exposed electrode balls. It has been found that uranium glass will wet tungsten and adhere more closely thereto, whereby to form a more effective seal, than most other combinations of practical materials.

Tungsten can be readily welded to platinum, but cannot be easily welded directly to copper. However, nickel can be easily welded to both tungsten and copper. Therefore, the nickel sleeves 34 and 35 are employed to connect the exposed inner ends of the tungstn wires 32, 33 to the copper lead wires 36, 37 by the respective pairs of welds at the ends of the nickel sleeves.

While a specific embodiment of an improved conductivity measuring device has been disclosed in the foregoing description, it will be understood that various modifications within the spirit of the invention may occur to those skilled in the art. Therefore it is intended that no limitations be placed on the invention except as defined by the scope of the appended claim.

What is claimed is:

A self-contained Karl Fischer titration device comprising a housing adapted to be held manually, a meter in said housing having a scale and a movable pointer visibly exposed at one wall of the housing, a hollow tubular glass electrode assembly secured to the opposite wall of the housing and having a sealed uranium glass tip provided with a pair of spaced exposed platinum contact balls, respective platinum wires mechanically connected to said contact balls, respective tungsten conductor wires mechanically connected to said platinum wires, the platinum wires and the ends of the tungsten wires being sealingly embedded in said uranium glass tip and the tungsten wires having outer ends extending into the interior of said hollow electrode assembly, respective nickel sleeve members welded to the outer ends of said tungsten wires, a battery in said housing, and circuit means connecting said battery and meter in series and including a pair of copper lead wires extending into said electrode assembly and welded respectively to the nickel sleeve members.

References Cited

UNITED STATES PATENTS

| | | | |
|---|---|---|---|
| 933,015 | 8/1909 | Bishop | 324—30 |
| 1,592,979 | 7/1926 | Keeler | 324—30 |
| 1,083,074 | 6/1937 | Maass | 324—30 |
| 2,211,394 | 8/1940 | Vogel | 324—30 |
| 2,328,853 | 9/1943 | Sherrard | 324—65 |
| 2,555,937 | 6/1951 | Rosenthal et al. | 324—30 |
| 2,769,140 | 10/1956 | Obenshain | 324—30 |
| 2,864,252 | 12/1958 | Schaschl | 324—30 |
| 3,302,102 | 1/1967 | Lace | 324—30 |

OTHER REFERENCES

John Strong: "Procedures in Experimental Physics," 1938, Prentice-Hall, Inc., New York, pp. 23–27 and 581–582 relied on; copy in Scientific Library (QC 4 S8, 1938).

RUDOLPH V. ROLINEC, *Primary Examiner.*

WALTER L. CARLSON, C. F. ROBERTS, *Examiners.*